United States Patent Office 2,979,377
Patented Apr. 11, 1961

2,979,377

MICROBIOLOGICAL CORROSION PROTECTION BY GERMICIDAL ZONE AND PROTECTIVE COATING

Donald O. Hitzman, Bartlesville, Okla., and Ralph P. Schneider, Houston, Tex., assignors to Phillips Petroleum Company, a corporation of Delaware No Drawing. Filed Nov. 7, 1956, Ser. No. 620,799

6 Claims. (Cl. 21—2.5)

This invention relates to the prevention of microbiological corrosion. In one aspect, this invention relates to the prevention of microbiological corrosion of an object which is at least partially buried in the earth. In another aspect this invention relates to incorporating a bactericide into the soil surrounding an object at least partially buried in the earth so as to inhibit the growth of microorganisms in said soil.

The corrosion of iron and steel is primarily an electrochemical process. However, mechanical factors such as different metals being in contact with one another, the motion of a metal surface in water, or the motion of water flowing over a metal surface, sometimes influence the electrochemical processes responsible for corrosion. It is also known that microorganisms can exert effects which influence said electrochemical processes and thus markedly accelerate the corrosion rate.

Microorganisms cannot promote corrosion unless their environment is suitable for their growth and multiplication. Essentials for microbial growth are moisture, a suitable pH, certain essential minerals such as phosphorous, potassium, nitrogen, sulfur, iron, etc., a source of carbon such as organic matter or carbon dioxide, and a source of energy such as sunlight, organic matter or an oxidizable inorganic substance. All of these essential factors are usually present when iron or steel comes in contact with soil and particularly a moist soil.

In the past, two main types of protection have been employed to protect buried metal objects from microbiological corrosion as well as other types of corrosion. These are (1) cathiodic protection, and (2) protective coatings and/or wrappings. Cathodic protection is effective in most cases. However, it does not afford adequate protection in all cases, particularly where sulfate reducing bacteria are present. Cathiodic protection also has the disadvantage that it is expensive and requires more or less constant maintenance. It is not well adapted for ready convenient use in either isolated or small individual installations.

Protective coatings (which includes wrappings) is more widely used than cathodic protection primarily because it is less expensive and more readily installed in many instances. Bituminous protective coatings are the most widely used. Aerobic bacteria in particular can attack and destroy some bituminous coatings in a relatively short time. Bituminous coatings also have the disadvantage that, being plastic materials, they are subject to distortion by the continual pressure of the soil. Many heavy soils tend to shrink as they dry. Such soils frequently adhere to the unprotected coatings and the resulting soil stress may be great enough to rupture the coating. For this reason, a wrapper is usually employed along with bituminous coating materials. The use of such wrappers gives improved results but also increases the cost of the protective coatings.

We have found that the above difficulties can be eliminated or at least substantially mitigated by providing at least one protective zone, i.e., a zone wherein the growth of microorganisms capable of exerting effects which influence the electrochemical processes responsible for corrosion is inhibited, around an object which is at least partially buried in the earth. Thus, broadly speaking, our invention comprises incorporating a germicide with the soil immediately surrounding an object at least partially buried in soil.

An object of this invention is to prevent microbiological corrosion of objects which are at least partially buried in soil. Another object of this invention is to provide a method for preventing microbiological corrosion of objects at least partially buried in soil. Another object of this invention is to provide a method for preventing microbiological corrosion of metal objects, which are at least partially buried in soil, such as pipes, pipelines, tanks, and posts. Still another object of this invention is to prevent the corrosion of a buried object by the addition of a bactericide to the soil immediately surrounding said buried object. Still another object of this invention is to provide a method for preventing microbiological corrosion of an object which is at least partially buried in the earth wherein said method provides at least two zones of protection, in which the growth of microorganisms capable of causing said corrosion is inhibited, are provided. Other aspects, objects and advantages of the invention will be apparent to those skilled in the art in view of this disclosure.

Thus according to the invention there is provided a method for preventing microbiological corrosion of an object which is at least partially buried in soil, said corrosion being due to the presence of microorganisms in the soil around said object, which comprises adding a germicide to said soil in an amount sufficient to effectively inhibit growth of said microorganisms.

In a presently preferred embodiment of the invention, the treated soil fill containing a selected germicide is employed in combination with a conventional protective coating composition. Some protective coating materials, particularly those of the bituminous type such as coal tar pitch and petroleum asphalts, inherently possess a measure of bactericidal action in that microorganisms must adapt to growth and multiplication in or on said protective coating. Thus, when the soil fill containing the selected bactericide is employed to fill an excavation wherein an object is at least partially buried, which object has been coated with a protective coating material, there are established two zones of protection around said object. In such cases, the microorganisms must first adapt to the soil environment, i.e., they must adapt for growth and multiplication in the germicide treated soil. If the microorganisms successfully adapt so as to thrive in the treated soil, they must then re-adapt to the protective coating material. By thus employing two zones of protection, each having a different germicidal action, the measure of protection is greatly increased because the above referred to double adaptation by the microorganisms is extremely unlikely.

In instances where the maximum degree of protection is desired, a selected germicide can be incorporated in the protective coating material, thus increasing the germicidal action of said protective coating material. When a specific selected germicide is thus employed, a different or dissimilar germicide is employed to treat the soil surrounding the protective coated object so as to set up the two zones of protection, each having a different germicidal action, described above.

Any suitable germicide can be employed in the practice of our invention. Said germicide can be either water soluble or water insoluble, however, in most instances, water insoluble germicides are preferred so as to minimize leaching thereof from the soil. The actual choice of the germicide to be employed will depend upon the existing conditions in the environment and the type of microorganisms generally prevalent in the soil. For example, the anaerobic sulfate-reducing bacteria (desulfovibrio desulfuricans) are usually found in wet highly reduced soils. These bacteria liberate hydrogen sulfide. They can be combated by the use of arsenicals or chlorophenols. Another type of bacteria which causes microbiological corrosion are the sulfur oxidizing bacteria (thio-bacillus thiooxidans) which produce acids. These organisms can be combated by the use of phenolic compounds or cresols. Other acid producing bacteria are the nitrosifying bacteria which oxidize ammonia to nitrous acid and the nitrifying bacteria which oxidize nitrous acid to nitric acid. These acid producers can also be combated by the use of phenols or cresols. The actual selection of a germicide will depend upon the efficiency of the germicide for inhibiting growth of the microorganism which it is desired to combat, its toxicity to human beings and animals, ease of handling, its solubility in water, and its cost.

Examples of bactericides which are suitable for use in the practice of our invention include, among others, the following: chlorophenols such as trichlorophenol, tetrachlorophenol, and pentachlorophenol; arsenical compounds such as calcium arsenate and lead arsenate; copper compounds such as cuprous oxide and copper sulfate; mercuric salts such as phenylmercuric nitrate, mercuric chloride and phenylmercuric acetate; quaternary ammonium salts and amines such as dimethyl ammonium chloride, and trimethyl ammonium chloride; phenolic compounds such as phenol, o-cresol, m-cresol, p-cresol and creosote; iodinated or fluorinated compounds such as iodoform, sulfathiazole, and sodium fluoride; and chloroamines such as sodium p-toluenesulfonchloroamine, sodium p-benzenesulfonchloroamine.

The amount of germicide employed in the practice of the invention will depend upon the type of bacteria which it is desired to protect against, the conditions under which it is to be employed and the degree of protection desired as will be understood by those skilled in the art in view of this disclosure. The amount employed can range from 5 to 500 parts per million, or higher, with 50 to 100 parts per million being a more usually employed amount. Generally speaking, germicidal levels in the range of 20 to 75 parts per million are preferred.

When treating a soil fill which is to be returned to an excavation in the practice of the invention, the bactericide, when a solid, can be dry blended directly with the soil in any convenient manner. If the bactericide is a liquid, or is more conveniently employed in solution form, it can be sprayed onto the soil with constant stirring of said soil during the spraying. It is not necessary to treat the entire fill which will surround the object in an excavation. In most cases, a portion of the fill sufficient to provide a layer from one to six inches in thickness around the buried object is treated with the germicide. Treated fill thicknesses of two to three inches are usually preferred.

Since the amount of germicide which is added to the fill is relatively small compared to the bulk of said fill, it is frequently convenient to employ an inert germicidal adjuvant material as a carrier for the germicide. By the term "germicidal adjuvant," we mean a substance which is capable of presenting or aiding in the presentation of a germicide so that its germicidal action will be more effectively realized. The term "adjuvant" is well established in the art where it is recognized that an active agent or germicide is frequently, in itself, of little practical utility unless it be presented in a form suitable for subjecting the microorganisms to the action of the germicide. Thus additional material or materials are frequently employed in the formulation of active germicidal agents, such materials being referred to as adjuvants.

Suitable germicidal adjuvants or carriers for use in the practice of the invention are diatomaceous earth, fullers earth, kieselguhr, or other inert earth materials. When employing such materials, the germicide is added thereto in an amount to give a concentrated germicidal agent. For example, sufficient germicide can be added to the inert material to give an agent containing 500, 5,000, or even as much as 50,000 parts per million of the germicide. Then if it is desired to treat a soil fill so that it will contain 50 parts per million of germicide, an aliquot part of the concentrated material can be mixed with the soil fill.

Reference has been made herein to bituminous type protective coating materials. The term "protective coating" is employed generically herein and in the claims to include materials which are applied as a coat or layer on the surface of the object to be protected, such as a coal tar pitch or petroleum asphalt, and also materials which are commercially referred to as wrapping materials and which are applied on the outside of the layer of coal tar pitch or petroleum asphalt. The term "bituminous" is employed generically to include both coal tar pitches and petroleum asphalts as has been indicated. Thus, the combined term "bituminous protective coating" is used generically to include a protective coating which comprises a layer of bituminous material on the pipe or other object to be protected, and a layer of wrapping material such as asphalt saturated rag, asphalt saturated asbestos felt, or glass fiber mats, applied outside said bituminous coating. If desired, another layer of the bituminous material can then be added to the outside of the wrapping material and still another layer of wrapping material outside said another layer of bituminous material. Such protective coatings are well known to those skilled in the art and are widely used in the protection of pipelines, tanks, etc. Detailed specifications of materials and methods of applying same can be found in the booklet "Asphalt Protective Coatings for Pipelines" Construction Series, No. 96, published by the Asphalt Institute, 801 Second Avenue, New York, New York. Said booklet also gives specifications for petroleum asphalts suitable for use as protective coatings for pipelines or other buried objects. Specifications for suitable coal tar pitches can be found in the Booklet AWWA C203-51 published by the American Water Works Association, 521 5th Avenue, New York, New York.

When a germicide is incorporated into the protective coating so as to increase the germicidal action of said protective coating, the germicide can be added to the petroleum asphalt or coal tar pitch. Since said asphalt or pitch is usually applied, by brushing, spraying, or dipping, at an elevated temperature, in the neighborhood of 300 to 400° F., the germicide selected must be one having a boiling point above that temperature and is preferably soluble in said asphalt or pitch, at least to the extent necessary to incorporate the desired amount, although dispersions of the germicide in the asphalt or pitch are operable. The amount of germicide incorporated into said asphalt or pitch will be in the range above specified for use in the practice of the invention.

While the invention has been described with particular reference to bituminous protective coatings, it should be understood that it is within the scope of the invention to employ other types of protective coating materials such as polyvinyl chlorides and any of the various resinous or plastic type coating compositions which are available commercially.

The following example will serve to further illustrate the invention.

*EXAMPLE*

An excavation of suitable size for receiving a 3' x 6' gasoline storage tank is made in the earth. The soil in the particular location selected is a wet marshy highly reduced type of soil in which sulfate-reducing bacteria thrive. Prior to installing said tank in said excavation, the tank is coated, by brushing, with a layer of molten petroleum asphalt about 3/32 inch thick having incorporated therein commercial grade pentachlorophenol in an amount sufficient to give about 75 parts of pentachlorophenol per million parts of asphalt. A layer of asphalt saturated asbestos felt is then wrapped around the asphalt coated tank. The petroleum asphalt and the asphalt saturated felt are commercial products meeting the specifications of The Asphalt Institute.

A portion of the soil removed during the excavation is treated with sufficient commercial grade meta cresol to give a germicidal level of 65 parts of meta cresol per million parts of soil. A layer of the treated soil from 2 to 3 inches thick is then placed in the bottom of said excavation. The tank is then lowered into the excavation and the remainder of the treated fill earth placed there around to provide a treated fill thickness of about 2 to 3 inches around said tank.

While the invention has been described with particular reference to preventing corrosion of metal objects such as pipelines and tanks, it is to be understood that the invention can also be employed for the protection of objects made of materials other than metal. The invention is applicable for the protection of any buried or partially buried object which is subject to attack by microorganisms, for example, concrete foundations.

Various other modifications and variations of the invention will be apparent to those skilled in the art in view of the above disclosure. Said modifications and variations are believed to be within the spirit and scope of the invention.

We claim:

1. A method for preventing microbiological corrosion of a corrodible object which is to be at least partially buried in an excavation in the earth, said corrosion being due to the presence of microorganisms in the soil from said excavation and which soil is to be employed as fill around said object, which method comprises: mixing a first germicide into a protective coating material and applying a layer of said protective coating material to form a first protective zone around said object; incorporating a second germicide with said microorganism-infected soil in an amount sufficient to effectively inhibit growth of said microorganisms; placing said object into said excavation; and placing said soil having said germicide incorporated therewith into said excavation in a manner so as to surround said coated object in said excavation and form a second protective zone around said object.

2. A method according to claim 1 wherein said object is a corrodible metal object.

3. A method according to claim 1 wherein said object is a corrodible metal pipe.

4. A method according to claim 1 wherein said second germicide is incorporated in said soil in an amount within the range of 5 to 500 parts per million parts of said soil.

5. A method for preventing microbiological corrosion of a metal object which is to be at least partially buried in an excavation in the earth, said corrosion being due to the presence of microorganisms in the soil from said excavation and which soil is to be employed as fill around said object, which method comprises: mixing a first germicide into a bituminous coating material, applying a layer of said bituminous coating caterial to said metal object to form a first protective zone around said object; incorporating a second germicide with at least a portion of said microorganism-infected soil in an amount sufficient to effectively inhibit growth of said microorganisms; placing said object in said excavation; and placing said soil having said germicide incorporated therewith into said excavation in a manner so as to surround said object and thus establish a second zone of protection around said object.

6. A method for preventing microbiological corrosion of a metal object which is to be at least partially buried in an excavation in the earth, said corrosion being due to the presence of microorganisms in the soil from said excavation and which soil is to be employed as fill around said object, which method comprises: mixing a first germicide into a bituminous coating material, applying a layer of said bituminous coating material to said metal object to form a first protective zone around said object; blending a predetermined amount of a germicide with a predetermined amount of an inert finely divided solid germicide adjuvant as a carrier for said germicide so as to form a concentrated germicidal mixture; blending an aliquot of said germicidal mixture with at least a portion of said microorganism-infected soil to form a fill mixture containing sufficient of said germicide to inhibit growth of said microorganisms; placing said soil having said germicide incorporated therewith into said excavation in a manner so as to surround said object in said excavation and thus establish a second zone of protection around said object.

References Cited in the file of this patent

UNITED STATES PATENTS

| 2,228,262 | Engels et al. | Jan. 14, 1941 |
| 2,769,921 | Nahin et al. | Nov. 6, 1956 |
| 2,833,006 | Andrews et al. | May 6, 1958 |

FOREIGN PATENTS

| 481,606 | Great Britain | Mar. 15, 1938 |
| 710,566 | Great Britain | June 16, 1954 |

OTHER REFERENCES

Burns et al.: "Protective Coatings for Metals," 2nd ed., 1955, p. 602.

Uhlig: "Corrosion Handbook," Electrochem. Soc., N.Y.C., 1948, pp. 476, 477.

Chem. and Eng. News, vol. 31, No. 3, Jan. 19, 1953, p. 304 ("Old Shoes Prevent Corrosion").

J.S.C.I., vol. 66, May 1947, p. 141.